Nov. 1, 1932.  V. QUAEDVLIEG  1,885,626
CHURN
Filed Feb. 9, 1931  2 Sheets-Sheet 1
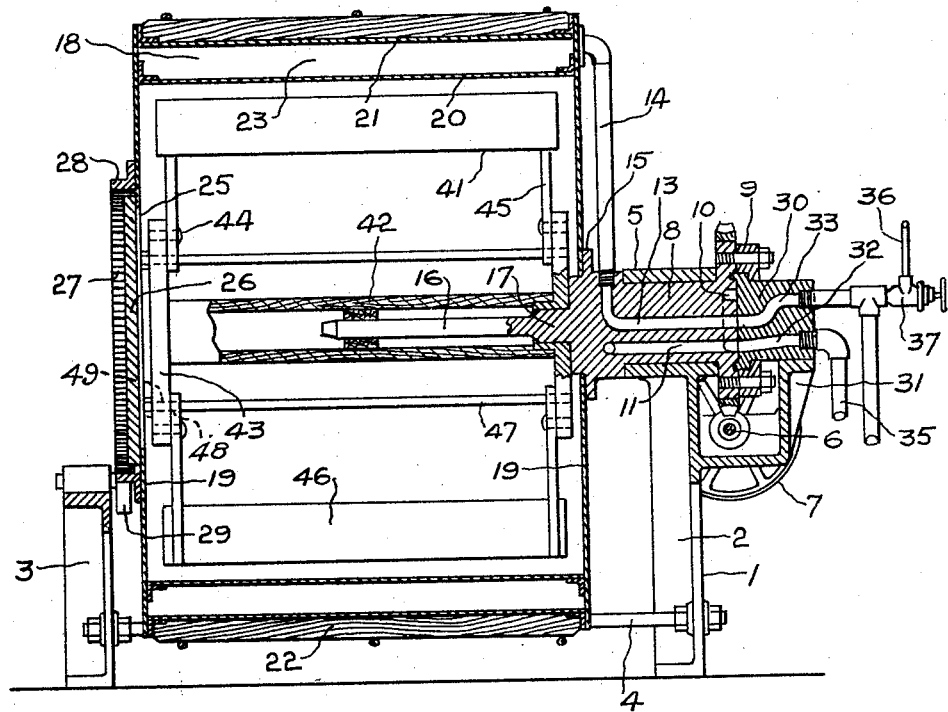
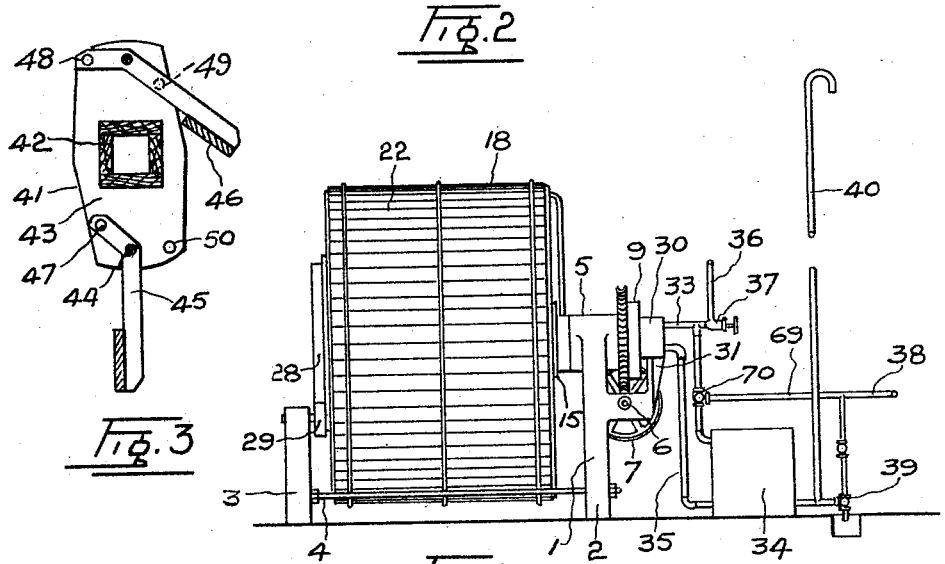
INVENTOR
VICTOR QUAEDVLIEG,
BY
*Fetherstonhaugh & Co*
ATTORNEYS

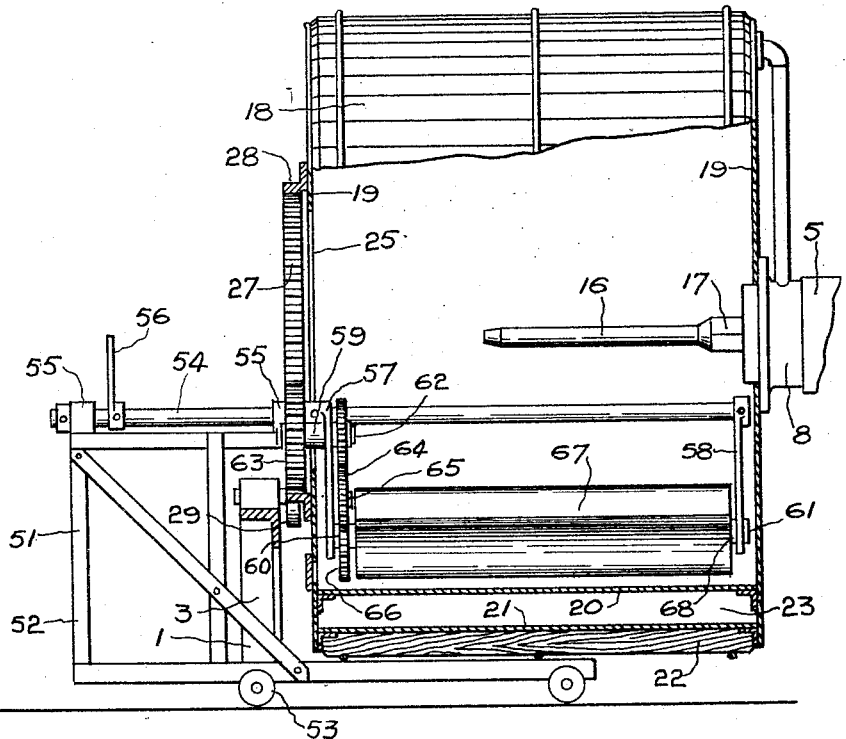
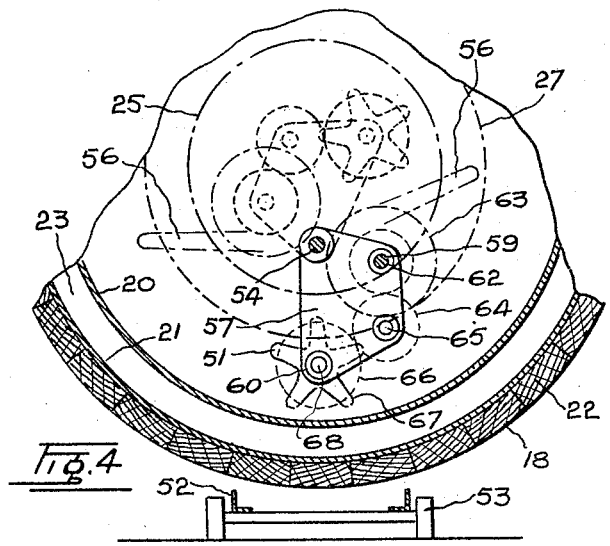
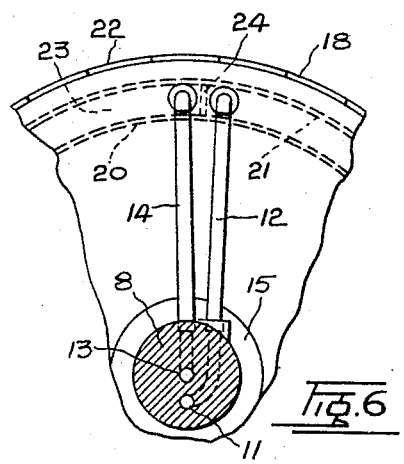

Patented Nov. 1, 1932

1,885,626

UNITED STATES PATENT OFFICE

VICTOR QUAEDVLIEG, OF KEREMEOS, BRITISH COLUMBIA, CANADA

CHURN

Application filed February 9, 1931. Serial No. 514,418.

My invention relates to improvements in churns, which has for its particular object the provision of means whereby the cream to be churned is carried through its various processes from raw cream to butter in the same drum, to provide means whereby the use of fixed vanes or paddles within the drum is avoided and an unobstructed interior to the drum is obtained, to avoid the use of wood in all permanent interior drum parts with its attendant objections, and to provide a combined heating and cooling system to the drum whereby the cream can be sterilized, cooled to churning temperature and maintained at said temperature during the churning operation.

The invention consists essentially of a rotatable drum having a water jacket forming part of a circulatory system and a butter working element for the drum, which is adapted to work the butter between a roll and the peripheral wall of the drum, as will be more fully described in the following specification and shown in the accompanying drawings, in which:—

Fig. 1 is a general view of the invention showing the water circulating system.

Fig. 2 is a longitudinal sectional view showing the churning paddle in position.

Fig. 3 is a sectional view of the churning paddle partly collapsed.

Fig. 4 is a transverse sectional view showing the butter worker in adjusted position within the churn.

Fig. 5 is a longitudinal sectional view showing the butter worker in position within the churn.

Fig. 6 is a fractional end view of the drum showing the connections to the water jacket.

In the drawings like characters of reference indicate corresponding parts in each figure.

The numeral 1 indicates generally a frame consisting of two transverse standards 2 and 3 suitably connected together by tie rods 4. The standard 2 supports a main bearing 5 and a suitably journalled worm drive shaft 6 having a drive pulley 7.

Journalled in the bearing 5 is a heavy main shaft 8 having a flange 9 at its outer end provided with an annular groove 10 which communicates with a water duct 11 having an outlet from the shaft in a radial pipe 12, see Figure 6. A central duct 13 extends through the shaft and terminates in another radial pipe 14. The inner end of the shaft 8 is provided with a flange 15 and an inward shaft extension 16 having at its connecting end a square portion 17, the purpose of which will hereinafter appear. Mounted upon the face of the flange 15 is a drum 18 having inner and outer end walls 19, an inner peripheral wall 20 and an outer peripheral wall 21, which latter is preferably lagged with cork or other suitable insulating material as at 22. The drum is preferably made of stainless steel with welded joints for sanitary purposes.

Between the peripheral walls 20 and 21 a water jacket 23 is defined which is intersected longitudinally by a wall 24, shown in dotted line in Figure 6. The pipes 12 and 14 communicate with the water jacket 23 adjacent to and on opposite sides of the wall 24 for the purpose of causing water entering the jacket through one of them to flow completely around the drum before it passes out through the other. The outer end wall 19 of the drum 18 is provided with a circular opening 25 fitted with a detachable cover 26 which is equipped with the usual devices such as observation window, thermometer and the like, not shown.

Surrounding the opening 25 is an internal gear 27 for the purpose of imparting a drive to the butter roll to be hereinafter described. The exterior of the gear forms an annular ring as at 28 which is rotatably supported by a pair of rollers 29 carried from the transverse standard 3. Fitted upon the end of the shaft 8 is a non-rotatable gland 30 which is supported upon a bracket 31. This gland is bored to provide two ducts 32, and 33, the former communicating with the groove 10 in the shaft and the latter with the central duct 13. The duct 32 communicates with the base of a sealed tank 34 through a water pipe 35, and the duct 33 communicates with the top of the tank and also with a steam pipe 36 through a valved jet 37. Water is supplied to the tank 34 from a water service pipe 38 through a three way valve 39 which serves also as a discharge valve for the tank. An expansion pipe 40 extends upwards from the base of the tank in the manner usually provided in such installations. A removable paddle generally indicated by the numeral 41 is adapted to be supported upon the shaft extension 16. The paddle consists of a rectangular member 42 which conforms interiorly to the square section 17 of the shaft and is adapted to be turned thereby, and secured to opposite extremities of the rectangular member are end members 43. Pivotally mounted at diametrically opposite points as at 44 on the end members are cranked arms 45 which support between each pair a blade 46. these blades when extended as shown in the lower half of Figure 3, are adapted to engage the inner faces of the inner peripheral walls 20 of the drum and to be held in that position by a pair of bolts 47 passing through apertures 48, through the inner ends of the arms 45 and through complementary apertures 49 in the end members 43, further complementary apertures 50 are provided in order that the blades, in a like manner, may be held in collapsed position to enable the paddle to be inserted into the drum or removed therefrom.

It will be noticed that when the paddle is fixed in extended position in the drum that it will, by virtue of its connection to the squared portion 17 of the shaft extension 16 rotate therewith and that the blades will remain immovable in respect to the walls of the drum.

The mixing and salting of the butter is accomplished with the aid of a butter worker generally indicated by the numeral 51, see Figures 4 and 5, which consists of a frame 52 mounted on rollers 53 and capable of being moved to project under the drum 18. Supported upon the frame 52 is a longitudinal shaft 54 mounted in bearings 55, which shaft is capable of being rocked by a lever 56 and supports a pair of frames 57 and 58. The frame 57 includes two bearings 59 and 60, and the frame 58 includes one bearing 61.

A shaft 62 is journalled in the bearing 59 having a gear wheel 63 at its outer end which is driven by the internal gear 27 and which imparts rotation through the shaft to a gear 64. The gear 64 is rotatable upon a stub shaft 65 carried by the frame 57 and imparts a drive through a further gear wheel 66 to a substantially star shaped roller 67 mounted upon a shaft 68 and journalled in the bearings 60 and 61 in the frames 57 and 58.

When the butter worker is to be removed from operating position within the drum, the lever 56 is swung into a downward position, as shown in dotted line in Figure 4, thus raising the frames 57 and 58 into such a position above the shaft 54, that they may be withdrawn through the opening 25.

In operating the churn raw cream is poured into the drum 18 and the opening 25 is closed with the cover 26, the drum is slowly rotated through the driving pulley 7 from a suitable source of power, so as to keep the cream circulating. Water is circulated through the water jacket 23 which is supplied from the tank 34 through the pipes 13 and 14, and flows outwards through the pipes 11 and 12 back to the tank. Steam is admitted through the valved jet 37 into the water pipe, thus raising the temperature of the water and the drum, imparting such heat to the cream as to pasteurize it. When the pasteurization of the cream is completed the steam is shut off and the cream is allowed to cool, the cooling being accelerated by passing water direct from the supply branch 69 through a three way valve 70 into the water jacket and from thence through the tank 34 to discharge through the valve 39. When the cream is cooled to the desired churning temperature, the paddle 41 is fitted to the shaft extension 16 and its blades 46 set in place in contact with the inner peripheral walls 20 of the drum, which is again closed up as before and the drum rotated to produce butter from the cream. Subsequent to churning the paddle is removed and the contents of the drum are allowed to stand a sufficient time to enable the buttermilk to be drained off from the butter. When the butter has been relieved of its moisture the butter worker 51 is placed in position as shown in Figures 4 and 5 and the roller 67 lowered substantially into contact with the peripheral wall 20 of the drum. The drum is again rotated at a suitable speed and the butter is forced between said wall and the roller in such a manner as to thoroughly mix it and to intimately combine therewith such salt or other material as may be added to it.

It will thus be seen that I have invented a churn which can be easily cleaned after use and in which raw cream may be put through all the processes required to sterilize and churn it to butter.

What I claim as my invention is:

1. The combination with a churn of the horizontal drum type and having a concentric opening at one end, of a butter worker comprising a supporting frame, a shaft extending longitudinally thereof and adapted to be inserted into the drum parallel to the longitudinal axis of said drum, arms swingable about the shaft, a butter working roller carried at the free ends of the arms, means for driving the roller from the shaft, and means for driving the shaft.

2. The combination of a churn of the horizontal drum type and having a concentric opening at one end, of a butter worker comprising a supporting frame, a shaft extending longitudinally thereof and adapted to be inserted into the drum parallel to the longitudinal axis of said drum, arms swingable about the shaft, a butter working roller carried at the free ends of the arms, means for driving the roller from the shaft, and means for driving the shaft from the drum.

Dated at Keremeos, British Columbia, this 24th day of January, A. D. 1931.

VICTOR QUAEDVLIEG.